US012601275B1

(12) United States Patent
Smiddy et al.

(10) Patent No.: US 12,601,275 B1
(45) Date of Patent: Apr. 14, 2026

(54) CMC COMPONENT WITH COOLING CAVITY

(71) Applicant: RTX CORPORATION, Farmington, CT (US)

(72) Inventors: Winston Smiddy, South Windsor, CT (US); Paul M. Lutjen, Kennebunkport, ME (US); Alex J. Schneider, Manchester, CT (US); Peter Wilkins, Manchester, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 19/025,902

(22) Filed: Jan. 16, 2025

(51) Int. Cl.
*F01D 11/24* (2006.01)
*F23R 3/00* (2006.01)
*F23R 3/04* (2006.01)

(52) U.S. Cl.
CPC .............. *F01D 11/24* (2013.01); *F23R 3/007* (2013.01); *F23R 3/04* (2013.01); *F05D 2240/11* (2013.01); *F05D 2260/201* (2013.01); *F05D 2300/6033* (2013.01)

(58) Field of Classification Search
CPC .. F01D 11/24; F23R 3/007; F23R 3/04; F05D 2240/11; F05D 2260/201; F05D 2300/6033
See application file for complete search history.

(56) References Cited

U.S. PATENT DOCUMENTS

| | | | | |
|---|---|---|---|---|
| 5,333,443 | A * | 8/1994 | Halila | F23R 3/60 60/752 |
| 8,276,391 | B2 * | 10/2012 | Berry | F01D 9/023 60/758 |
| 9,051,846 | B2 | 6/2015 | Arilla et al. | |
| 9,482,107 | B2 | 11/2016 | Batt | |
| 10,100,737 | B2 | 10/2018 | Little et al. | |
| 10,301,960 | B2 * | 5/2019 | Stapleton | F01D 25/246 |
| 10,570,772 | B2 | 2/2020 | Smith et al. | |
| 2016/0017750 | A1 * | 1/2016 | Lefebvre | F01D 25/12 415/175 |
| 2023/0184136 | A1 * | 6/2023 | Kim | F01D 25/246 415/213.1 |

* cited by examiner

*Primary Examiner* — Michael K. Reitz
(74) *Attorney, Agent, or Firm* — Millen, White, Zelano & Branigan, P.C.; Brion P. Heaney

(57) ABSTRACT

The disclosure describes methods and devices for retaining and sealing cover plates or impingement plates for CMC components. One or more spring members are used to retain the cover plate or impingement plate in position to cover/seal cooling cavities within the interior of CMC components. The spring members include a contact region that contacts the cover plate or impingement plate, and an end section that contacts a restraining member.

18 Claims, 9 Drawing Sheets

CMC COMPONENT WITH COOLING CAVITY

FIELD OF THE INVENTION

The present disclosure relates generally to methods for manufacturing ceramic matrix composites (CMCs). In particular, the present disclosure concerns manufacturing CMC components with structures to facilitate cooling and directing/controlling the flow of cooling air.

BACKGROUND OF THE INVENTION

Gas turbine engines, in general, include a fan section, a compressor section, a combustion section, and a turbine section. Air enters through the fan section and is compressed in the compressor section before being introduced into the combustion section. In the combustion section, the air is mixed with fuel and ignited to generate a high-energy, high temperature gas flow. The high-energy, high temperature gas flow is expanded in the turbine section which is used to create thrust and to drive the compressor and fan sections.

Certain components of gas turbine engines are thus exposed to the high-energy, high temperature gas flow (flow path components). Therefore, it is desirable that such flow path components be made of heat resistant materials, for example, superalloys and ceramic matrix composites (CMCs). While these materials are heat resistant, to increase the operational lifespan of turbine engine components made these materials can be provided with structures to permit the flow of cooling fluid (e.g., cooling air) to interact with and cool the component.

While CMC materials can withstand much higher operating temperatures than components composed of superalloys, CMCs have comparably lower thermal conductivity than superalloys. Thus, it is particularly desirable to take steps to efficiently cool CMC components using available cooling air flows.

However, while cooling features can be relatively cast or machined into metallic materials such as Ni-based or Co-based superalloys, due to the sensitivity of fiber cutting creating such cooling features in CMC materials is more difficult. Further, due to the fibrous nature of the composite materials, in can be difficult to provide effective sealing of interfaces of CMC components of with support/assembly hardware made of metallic materials, such as surfaces involved in the sealing of cooling structures by means of, for example, metallic cover plates or impingement plates.

There is thus a continuing need for providing alternative and/or improved cooling structures and methods for manufacturing such cooling structures in CMC that allow for efficient and effective cooling of CMC components exposed to high temperature gas flow.

SUMMARY OF THE INVENTION

In general, the present disclosure relates to methods for retaining cover plates in CMC components, particularly cover plates used to cover cooling cavities in components such as blade outer air seals (BOAS).

The present disclosure is directed, in a first aspect, to a ceramic matrix composite (CMC) component comprising:

- a base having a radial outer surface and a radial inner surface inward surface, the base comprising a plurality of ceramic fiber plies and a ceramic matrix,
- a cooling cavity that extends from the outer radial surface of the base into an interior region of the base, the cooling cavity having a cavity opening at the outer radial surface of the base, the cooling cavity being defined by cavity side walls and a cavity bottom wall,
- an impingement plate or a cover plate covering the cavity opening, and
- at least one spring member comprising a contact region, a first curved region, and a first end section wherein the first curved region is connected to both the contact region and the first end section, the first end section is in contact with a restraining member, and the contact region is in contact with the impingement plate or cover plate and acts to hold the impingement plate or cover plate in position to cover the cavity opening.

The present disclosure is also directed, in a further aspect, to a method of assembling a CMC component with an impingement plate or cover plate, the method comprising:

- providing a CMC component comprising:
  - a base having a radial outer surface and a radial inner surface inward surface, the base comprising a plurality of ceramic fiber plies and a ceramic matrix,
  - a cooling cavity that extends from the outer radial surface of the base into an interior region of the base, the cooling cavity having a cavity opening at the outer radial surface of the base, the cooling cavity being defined by cavity side walls and a cavity bottom wall,
- providing an impingement plate or a cover plate to cover the cavity opening, and
- retaining the impingement plate or cover plate in a position to cover the cavity opening using at least one spring member comprising a contact region, a first curved region, and a first end section wherein the first curved region is connected to both the contact region and the first end section, the first end section is in contact with a restraining member, and the contact region is in contact with the impingement plate or cover plate and acts to hold the impingement plate or cover plate in position to cover the cavity opening.

The present disclosure is further directed, in an additional aspect, to a turbine engine comprising:

- a fan section, a compressor section, a combustion chamber, and a turbine section, the turbine section including at least one rotor and one or more turbine blade(s) extending radially outwardly from the at least one rotor;
- a blade outer air seal assembly positioned between the one or more turbine blade(s) and an outer casing to the engine;
- the blade outer air seal is formed from a plurality blade outer air seal segments, wherein each blade outer air seal segment comprises:
  - a base having a radial outer surface and a radial inner surface inward surface, the base comprising a plurality of ceramic fiber plies and a ceramic matrix,
  - a cooling cavity that extends from the outer radial surface of the base into an interior region of the base, the cooling cavity having a cavity opening at the outer radial surface of the base, the cooling cavity being defined by cavity side walls and a cavity bottom wall,
  - an impingement plate or a cover plate covering the cavity opening, and
  - at least one spring member comprising a contact region, a first curved region, and a first end section wherein the first curved region is connected to both the contact region and the first end section, the first end section is in contact with a restraining member, and the contact region is in contact with the impingement plate or cover plate and acts to hold the impingement plate or cover plate in position to cover the cavity opening.

In further embodiments of the present disclosure, including further embodiments of the above exemplary embodiments, the base is made of a SiC/SiC composite.

In further embodiments of the present disclosure, including further embodiments of the above exemplary embodiments, the spring member further comprises a second curved region and a second end section connected to the second curved region, wherein the contact region is connected to both the first curved region and the second curved region, and the second end section is contact with a further restraining member.

further embodiments of the present disclosure, including further embodiments of the above exemplary embodiments, the spring member further comprises a second curved region and a second end section connected to the second curved region, wherein the contact region is connected to both the first curved region and the second curved region, and the second end section is in contact with the restraining member.

In further embodiments of the present disclosure, including further embodiments of the above exemplary embodiments, the component further comprises a forward flange structure and an aft flange structure, each extending from the radial outer surface of the base, and wherein the restraining member is a tab projecting from the forward flange structure or the aft flange structure.

In further embodiments of the present disclosure, including further embodiments of the above exemplary embodiments, the component further comprises a forward flange structure and an aft flange structure, each extending from the radial outer surface of the base, wherein the restraining member and further restraining members are tabs, each projecting from the forward flange structure or the aft flange structure.

In further embodiments of the present disclosure, including further embodiments of the above exemplary embodiments, the component further comprises a forward flange structure and an aft flange structure, each extending from the radial outer surface of the base, wherein the first end section of the spring member includes a tab that extends in an axial direction wherein the tab is inserted into a slot in the forward or aft flange structure wherein the slot acts as the restraining member.

In further embodiments of the present disclosure, including further embodiments of the above exemplary embodiments, the component further comprises a forward flange structure and an aft flange structure, each extending from the radial outer surface of the base, and wherein the restraining member is a hollow tab projecting from the forward flange structure or the aft flange structure, and the first end section of the spring member is inserted into the hollow tab.

In further embodiments of the present disclosure, including further embodiments of the above exemplary embodiments, the component further comprises a forward flange structure and an aft flange structure, each extending from the radial outer surface of the base, wherein the restraining member and further restraining member are hollow tabs, each projecting from the forward flange structure or the aft flange structure, and the first end section and second end section of the spring member are each inserted into one of the hollow tabs.

In further embodiments of the present disclosure, including further embodiments of the above exemplary embodiments, the restraining member is a further structure/component of the engine separate from the CMC component.

In further embodiments of the present disclosure, including further embodiments of the above exemplary embodiments, the component further comprises a forward flange structure and an aft flange structure each extending from the radial outer surface of the base, the forward flange structure having a first attachment pin opening and a second attachment pin opening, and the aft flange structure has a first attachment pin opening and a second attachment pin opening, and a first attachment pin and a second attachment pin for attaching the CMC component to a support structure, the first attachment pin passing through the first attachment opening of the forward flange structure and the first opening of the aft flange structure, and the second attachment pin passing through the second opening of the forward flange structure and the second opening of the second flange structure, wherein the restraining member is either the first attachment pin or the second attachment pin.

In further embodiments of the present disclosure, including further embodiments of the above exemplary embodiments, the component further comprises a forward flange structure and an aft flange structure each extending from the radial outer surface of the base, the forward flange structure having a first attachment pin opening and a second attachment pin opening, and the aft flange structure has a first attachment pin opening and a second attachment pin opening, and a first attachment pin and a second attachment pin for attaching the CMC component to a support structure, the first attachment pin passing through the first attachment opening of the forward flange structure and the first opening of the aft flange structure, and the second attachment pin passing through the second opening of the forward flange structure and the second opening of the second flange structure, wherein the restraining member and further restraining member are the first attachment pin and the second attachment pin, respectively.

In further embodiments of the present disclosure, including further embodiments of the above exemplary embodiments, the first end section has a shape that corresponds to the contour of the restraining member at the area of contact.

In further embodiments of the present disclosure, including further embodiments of the above exemplary embodiments, the first end section has a shape that corresponds to the contour of the restraining member at the area of contact, and the second end section has a shape that corresponds to the contour of the further restraining member at the area of contact.

In further embodiments of the present disclosure, including further embodiments of the above exemplary embodiments, the spring member further comprises a further contact region, a second curved region connected to the further contact region, and a second end section connected to the second curved region, wherein the contact region and further contact region are both in contact with the impingement plate or cover plate and act to hold the impingement plate or cover plate in position to cover the cavity opening, and the second end section is contact with a further restraining member.

In further embodiments of the present disclosure, including further embodiments of the above exemplary embodiments, the component is a combustor liner.

In further embodiments of the present disclosure, including further embodiments of the above exemplary embodiments, the component is a blade outer air seal (BOAS) segment.

In further embodiments of the present disclosure, including further embodiments of the above exemplary embodiments, the component is a BOAS assembly comprising a plurality of BOAS segments arranged to form an annular shaped structure.

BRIEF DESCRIPTION OF FIGURES

The features of the disclosure believed to be novel and the elements characteristic of the invention are set forth with particularity in the appended claims. The figures are for illustration purposes only and are not drawn to scale. The disclosure itself, however, both as to organization and method of operation, can best be understood by reference to the description of the preferred embodiment(s) which follows, taken in conjunction with the accompanying drawings in which:

DETAILED DESCRIPTION OF THE INVENTION

Figure 1:
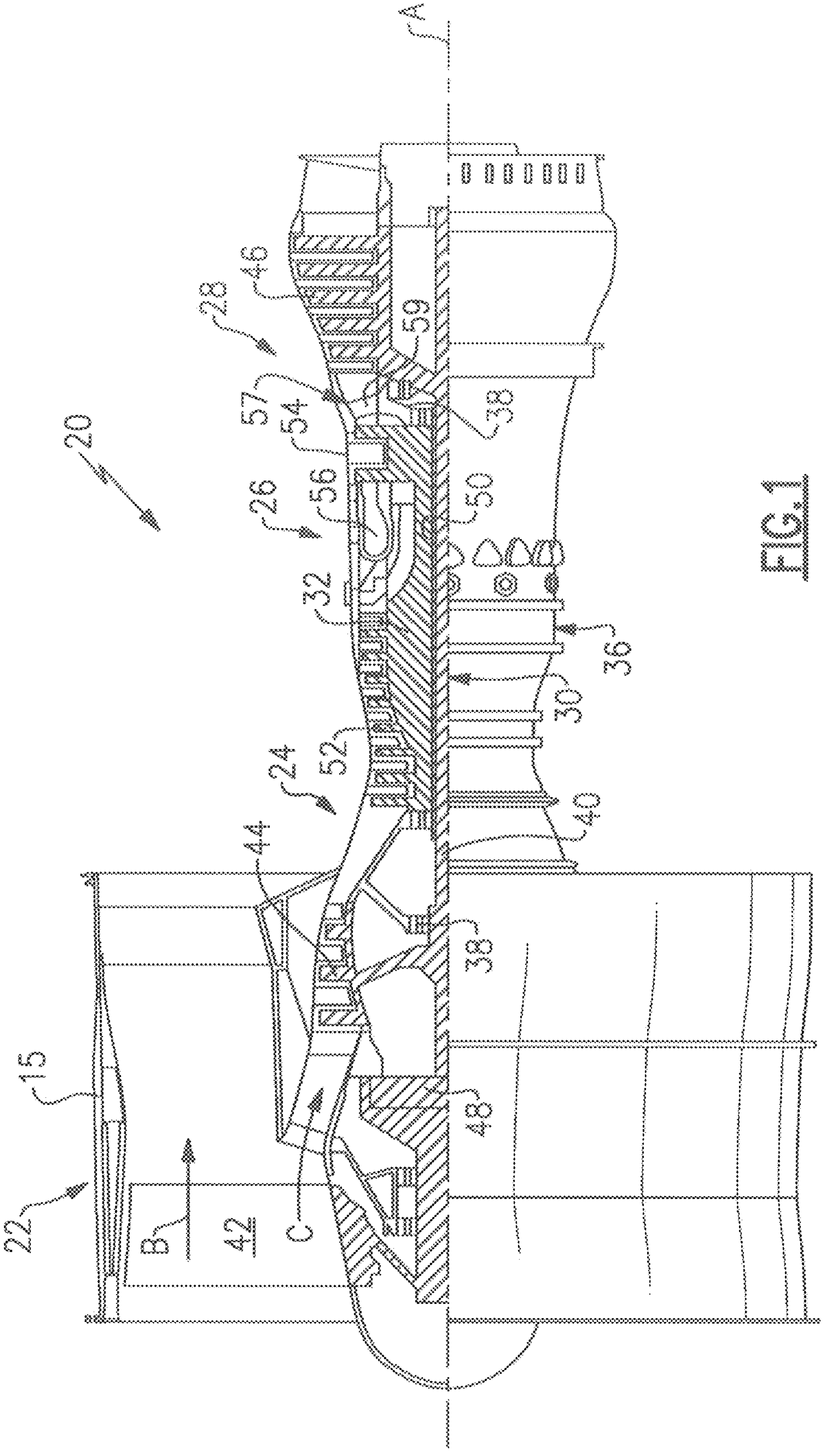
FIG. 1 schematically illustrates a partial cross section of an exemplary gas turbine engine.

The embodiments of the present disclosure can comprise, consist of, and consist essentially of the features and/or steps described herein, as well as any of the additional or optional ingredients, components, steps, or limitations described herein or would otherwise be appreciated by one of skill in the art. It is to be understood that all concentrations disclosed herein are by weight percent (wt. %.) based on a total weight of the composition unless otherwise indicated.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of the embodiments of the inventive concepts, numerous specific details are set forth in order to provide a more thorough understanding of the inventive concepts. It will be apparent to one skilled in the art, however, having the benefit of the instant disclosure that the inventive concepts disclosed herein may be practiced without these specific details.

While the discussion below often makes reference to BOAS and BOAS segments, it should be recognized that the present disclosure is not limited to BOAS but includes other CMC components used within jet engines that may be exposed to high temperature gas flows, for example, other seals, vane airfoils and platforms therefor, and combustor liners.

In the discussion below, axial refers to a direction that coincides with the longitudinal axis of the engine. Radial refers to a direction that is radial with respect to the longitudinal axis of the engine. Circumferential refers to a direction that corresponds to the circumference of a circle around the longitudinal axis of the engine. The leading edge/portion of a structure is the edge/portion that faces in the direction toward the flow of the hot gases, i.e., faces upstream. The trailing edge/portion of a structure is the edge/portion that the faces in the direction away from the flow of the hot gases, i.e., faces downstream.

FIG. 1 schematically illustrates an example of a gas turbine engine 20 (i.e., a two-spool turbofan) which includes a fan section 22, a compressor section 24, a combustor section 26, and a turbine section 28. Fan section 22 drives air along a bypass flow path B in a bypass duct defined within a housing 15, and also along a core flow path C for compression in compressor section 24, with subsequent introduction into combustor section 26, followed by expansion through turbine section 28. Although FIG. 1 depicts a two-spool turbofan gas turbine engine, it should be understood that the concepts described herein are not limited to use with two-spool turbofans engines and may be applied to other types of turbine engines.

Engine 20 generally includes a low speed spool 30 and a high speed spool 32 mounted for rotation about an engine central longitudinal axis A, relative to an engine static structure 36, via several bearing systems 38. Various bearing systems 38 at various locations may alternatively or additionally be provided. The location of bearing systems 38 may be varied as appropriate to the application.

The low speed spool 30 generally includes an inner shaft 40 that interconnects, a first (or low) pressure compressor 44 and a first (or low) pressure turbine 46. Inner shaft 40 is connected to fan 42 through a speed change mechanism, which in this exemplary embodiment is illustrated as a geared structure 48 to drive fan 42 at a lower speed than the low speed spool 30. High speed spool 32 includes an outer shaft 50 that interconnects a second (or high) pressure compressor 52 and a second (or high) pressure turbine 54. Combustor 56 is positioned between high pressure compressor 52 and high-pressure turbine 54. A mid-turbine frame 57 of the engine static structure 36 may be arranged generally between the high-pressure turbine 54 and the low-pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core air flow is first compressed by low pressure compressor 44, and then by the high-pressure compressor 52. Thereafter, the core air flow is mixed and burned with fuel in combustor 56, then expanded in high pressure turbine 54 and low-pressure turbine 46. The mid-turbine frame 57 includes airfoils 59 which are in the core airflow path C. The turbines 46 and 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low-pressure compressor, or aft of the combustor section 26 or even aft of turbine section 28, and fan 42 may be positioned forward or aft of the location of gear system 48.

The turbine section 28 includes at least one rotor and at least one blade extending radially outwardly from the rotor. The turbine section 28 may further include a blade outer air seal(s) (BOAS(s)). The blade outer air seal can be an assembly of a plurality of BOAS segments that together form an annular shaped shroud around the engine's central longitudinal axis A which is positioned between an outer casing of the engine and the turbine blade(s) of the turbine section.

As noted above, jet engine components, such as BOAS, BOAS segments, other seals, vane airfoils and platforms therefor, blade airfoils and platforms therefor, and combustor liners, can be made from CMC materials. In general, these CMC components are prepared by first creating a CMC preform which serves as the initial framework for creating the CMC component. The preform contains a stack of fabric sheets or plies in which the stack is formed via a layup process. The plies are made from ceramic fibers, or bundles of ceramic fibers called tows, held together with a binder. The fiber tows can be in the form of unidirectional tows or can be woven fibers. For example, the fibers can be woven into a two-dimensional fabric sheet or ply and then the plies are stacked during the layup process to form the preform. Alternatively, the preform can be in the form of a three-dimensional weave wherein, for example, a plurality of warp fibers are interwoven through a plurality of weft fiber layers. Binders can be used to help hold the fibers/plies together to provide a certain rigidity to the preform, for example, polymeric binders such as polyvinyl alcohol (PVA) or polyvinyl butyral (PVB).

The fibers/filaments used in the CMC preforms may be, for example, silicon carbide (SiC), carbon, mullite, zirconium carbide (ZrC), hafnium carbide (HfC), silicon nitride, aluminum oxide, or combinations thereof. The ceramic fibers may also be oxycarbide-, oxynitride-, carbonitride-, silicate-, boride-, phosphide-, or oxide-based fibers. In still further examples, the fibers are fully crystalline, partially crystalline, or predominantly amorphous or glassy. In one particular example, the fibers are SiC fibers.

After the CMC preform is formed by the layup, the preform is subjected to densification to add matrix material to fill the remaining void spaces within the preform. This procedure stiffens and strengthens the fiber layers or woven plies of ceramic fiber tows to form the CMC. Thus, densification involves reducing the porosity within the preform, making it more solid and robust, by filing the remaining pores within the preform. The goal is to achieve a higher relative density, and ensure that the final CMC structure is compact and free of large voids. In one particular example, the CMC material contains SiC fibers within a SiC matrix, also referred to as a SiC/SiC composite.

Various methods can be used to add matrix material during densification. These include, but are not limited to, chemical vapor infiltration (CVI), melt infiltration (MI), for example, reactive melt infiltration (RMI) (such as liquid silicon infiltration (LSI)), and polymer infiltration and pyrolysis (PIP).

Figure 2:
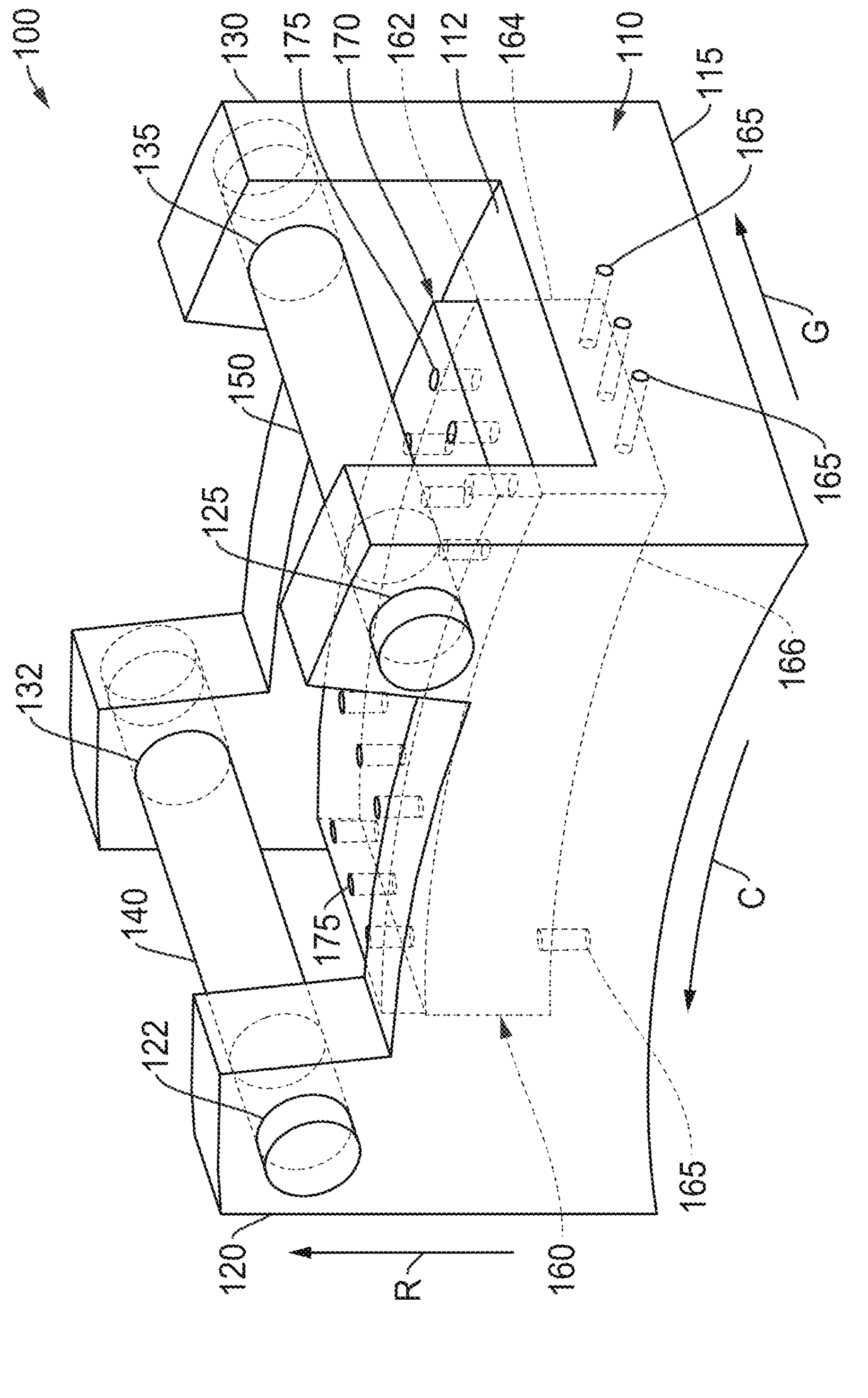
FIG. 2 is a perspective view of a blade outer air seal (BOAS) segment.

FIG. 2 illustrates a CMC component, specifically a blade outer air seal (BOAS) segment 100. In this figure, direction R indicates the radial direction, direction G indicates the axial direction or the direction of flow of hot gases through an engine, and direction C indicates a circumferential direction. The segment 100 includes a base 110 having a radial outer surface 112 and a radial inner surface 115. As shown in this embodiment, the radial outer surface 112 has a convex shape and the radial inner surface 115 has a concave shape. Segment 100 further includes a forward flange structure 120 and an aft flange structure 130. These two flange structures each extend from the radial outer surface 112 of the base 110. These flange structures are load bearing features and provide means for attaching the CMC component to another structure, for example, the outer casing of an engine. The base 110 and flange structures 120, 130 are made of a CMC material comprising a plurality of ceramic fiber plies and a ceramic matrix.

The flange structures are provided with openings to permit the attachment of retention/supporting hardware. As shown in FIG. 2, the forward flange structure 120 has a first opening 122 and a second opening 125. The aft flange structure also has a first opening 132 and a second opening 135. Also shown in FIG. 2 are attachment pins 140 and 150. The first attachment pin 140 passes through the first opening 122 of the forward flange structure 120 and the first opening 132 of the aft flange structure 130. The second attachment pin 150 passes through the second opening 125 of the forward flange structure 120 and the second opening 135 of the second flange structure 130.

The base 110 is also provided with a cooling cavity 160. The cooling cavity 160 extends from the outer radial surface 112 of the base 110 into an interior region of the base 110 and has a cavity opening 162 at the outer radial surface of the base. The cooling cavity 160 is defined by cavity side walls 164 and a cavity bottom wall 166. Additionally, the cooling cavity 160 can be provided with one or more cooling air outlets 165 to provide for the discharge of cooling air from the cooling cavity, for example, discharge though a side wall of base 110 or through the radial inner surface 115. The cooling cavity 160 can optionally be covered by a cover plate or impingement plate 170 in which or more cooling holes 175 are provided to allow cooling air to enter the cooling cavity 160.

The cooling cavity 160 can be formed in the base prior to densification of the CMC preform by precutting the fiber plies that are to be laid up to form the preform with a cavity or by cutting (machining) the cavity into the preform once the plies are laid up. Alternatively, the cooling cavity can be created by machining after an initial pre-densification, such as by chemical vapor infiltration (CVI), or after final densification.

Figure 3:
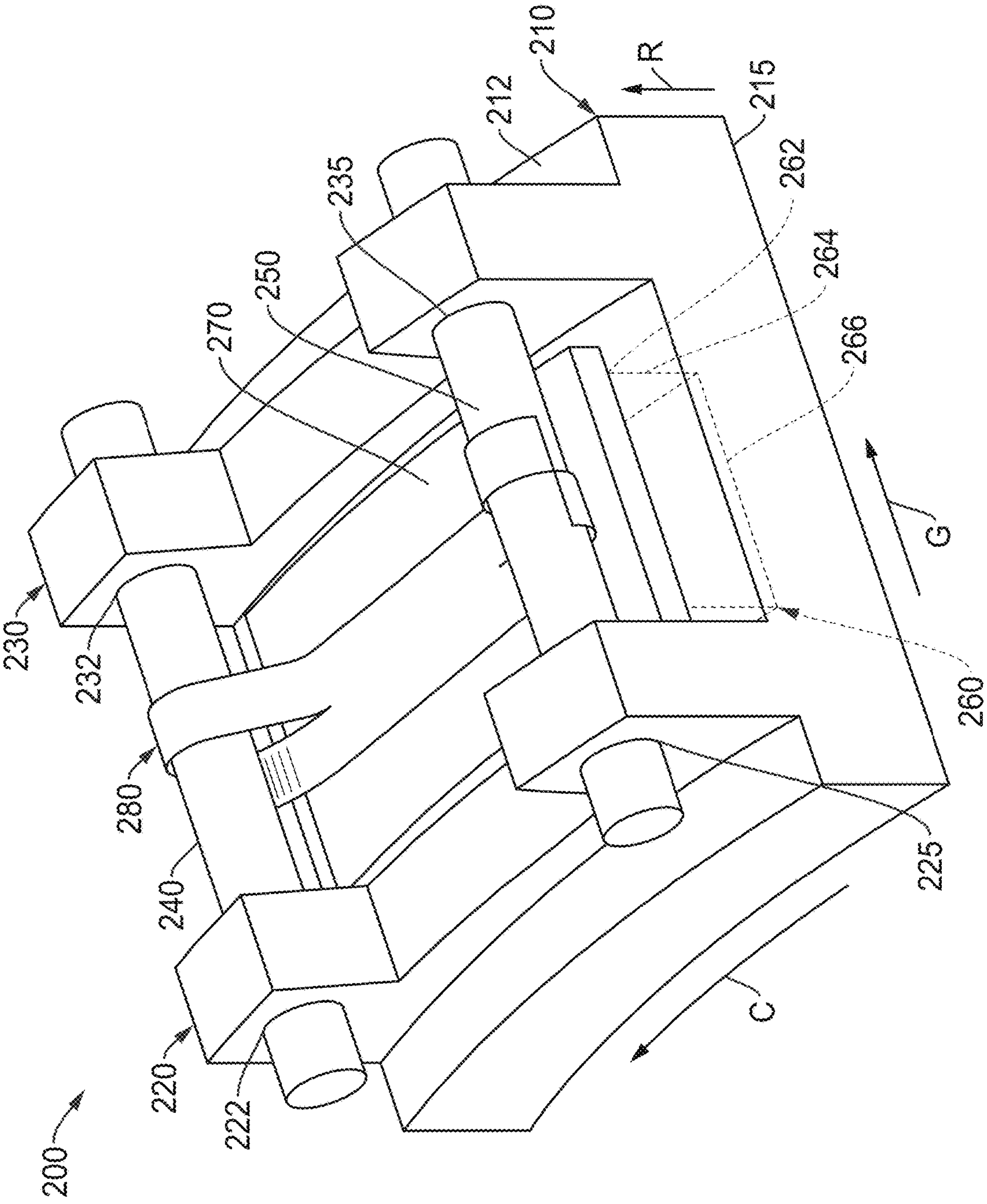
FIG. 3 is a perspective top view of a BOAS segment with retainer spring for retaining cover plate/impingement plate.

FIG. 3 shows a BOAS segment 200 having a retainer spring member in accordance with the present disclosure. The segment 200 includes a base 210 having a radial outer surface 212, a radial inner surface inward surface 215, a forward flange structure 220, and an aft flange structure 230. The forward flange structure 220 has a first opening 222 and a second opening 225. Similarly, the aft flange structure 230 also has a first opening 232 and a second opening 235. In this embodiment, the base 210 is also provided with a cooling cavity 260 having a cooling cavity opening 262 at the radial outer surface 212. The cooling cavity 260 is defined by side walls 264 and a cooling cavity bottom wall 266.

As shown in FIG. 3, a first attachment pin 240 passes through the first opening 222 of the forward flange structure 220 and the first opening 232 of the aft flange structure 230.

A second attachment pin 250 passes through the second opening 225 of the forward flange structure 220 and the second opening 235 of the second flange structure 230. Additionally, a cover plate or impingement plate 270 rests on the outer radial surface 212 and covers the cooling cavity opening 262. The cover plate/impingement plate 270 is held in position by a retainer spring member 280 in accordance with the present disclosure.

Figure 4:
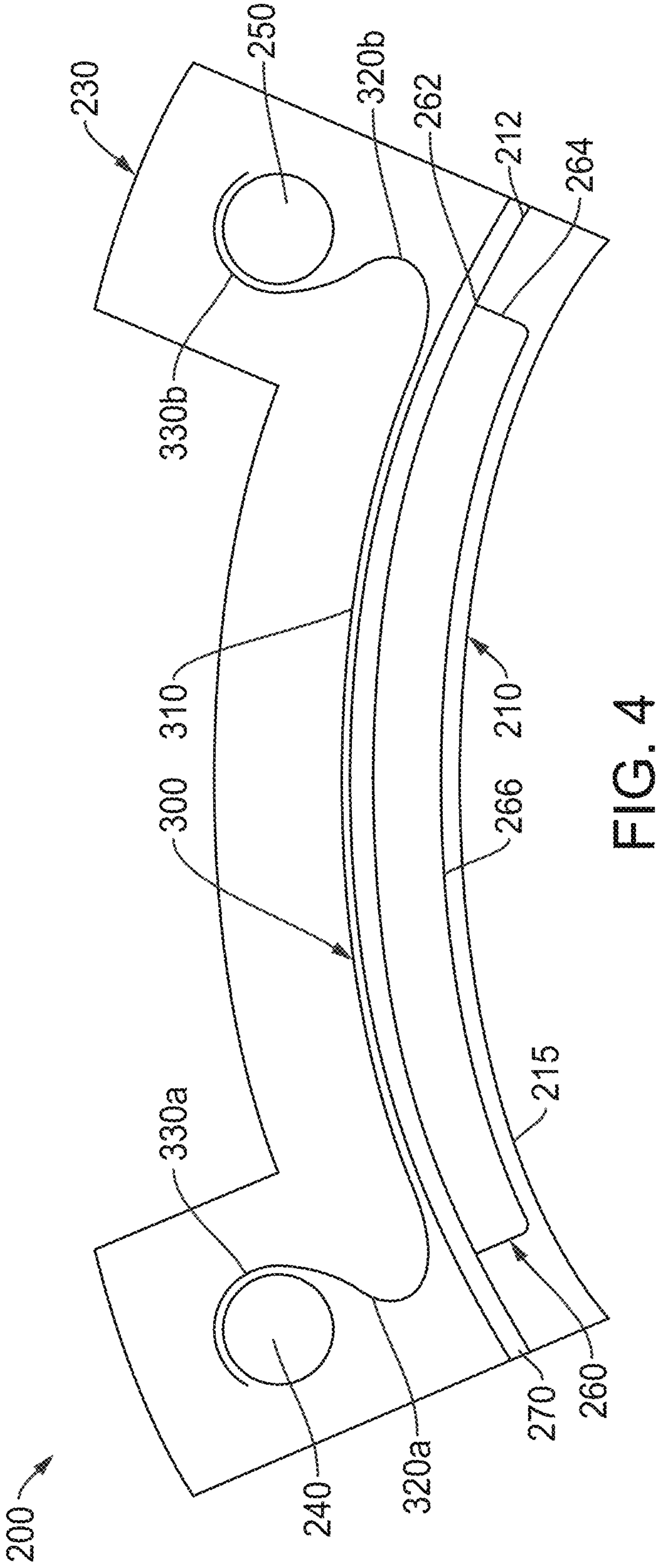
FIG. 4 is a cross sectional view of a BOAS segment with a first embodiment of a retainer spring.

FIG. 4 shows an embodiment of the retainer spring member in accordance with the present disclosure. While only one spring member is shown in the Figure, it should be understood that multiple spring members can be used. Spring member 300 includes a contact region 310 that contacts the cover plate/impingement plate 270. The spring member is in compression and applies a force to the cover plate/impingement plate 270 via the contact region 310 that is in contact therewith. The contact region 310 is connected to a first curved region 320*a* at one and thereof and is connected to a second curved region 320*b* at another end thereof. The first curved region 320*a* is connected to a first end section 330*a* of the spring member 300. The second curved region 320*b* is connected to a second end section 330*b* of the spring member 300. As shown in FIG. 4, the first end section 330*a* contacts attachment pin 240 and the second end section 330*b* contacts attachment pin 250. First end section 330*a* and second end section 330*b* have shapes that match the contour of the attachment pins where they contact the attachment pins. In this embodiment, the attachment pins 240 and 250 act as restraining members to hold the spring member 300 in compression.

Figure 5:
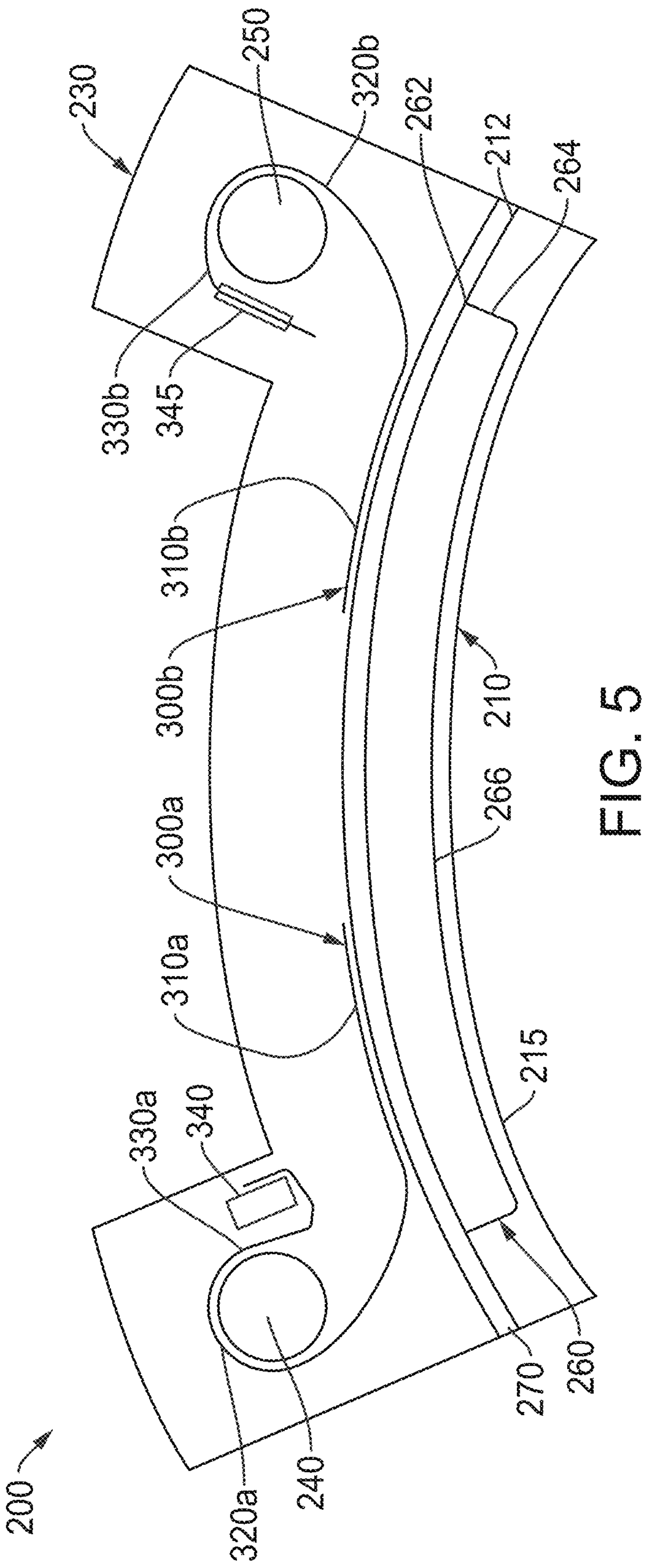
FIG. 5 is a cross sectional view of a BOAS segment with an embodiment using two retainer springs.

FIG. 5 shows a modification of the embodiment of FIG. 4 in which the individual spring member is replaced by two spring members. While only two spring members are shown, it should be understood that more than two spring members can be used. Spring members 300*a* and 300*b* each include a contact region 310*a* and 310*b*, respectively, that contact the cover plate/impingement plate 270. Both spring members 300*a* and 300*b* are in compression and apply a force to the cover plate/impingement plate 270 by their respective contact regions 310*a* and 310*b* which contact cover plate/impingement plate 270. Each contact region 310*a* and 310*b* is connected to a first curved region, 320*a* and 320*b*, respectively, at one end thereof.

For spring member 300*a*, the first curved region 320*a* wraps around attachment pin 240. The first end section 330*a* contacts tab 340 which extends from the surface of the aft flange structure 230 at a point adjacent the openings for the attachment pins. As an alternative, 340 could extend from the surface of the forward flange structure 220. The first end section 330*a* wraps around tab 340*a* and has a shape that matches the contour of tabs 340. In this embodiment, the tab 340 acts as restraining members to hold spring member 300 in compression. By using tab 340 as a restraining member, spring member 300*a* can be positioned to hold the cover plate/impingement plate 270 in place before attachment pin 240 is inserted into the BOAS segment 200. While only one spring member 300*a* interacting with attachment pin 240 is shown in the Figure, it should be understood the multiple spring members 300*a* can be provided that interact with attachment pin 240.

Figure 9:
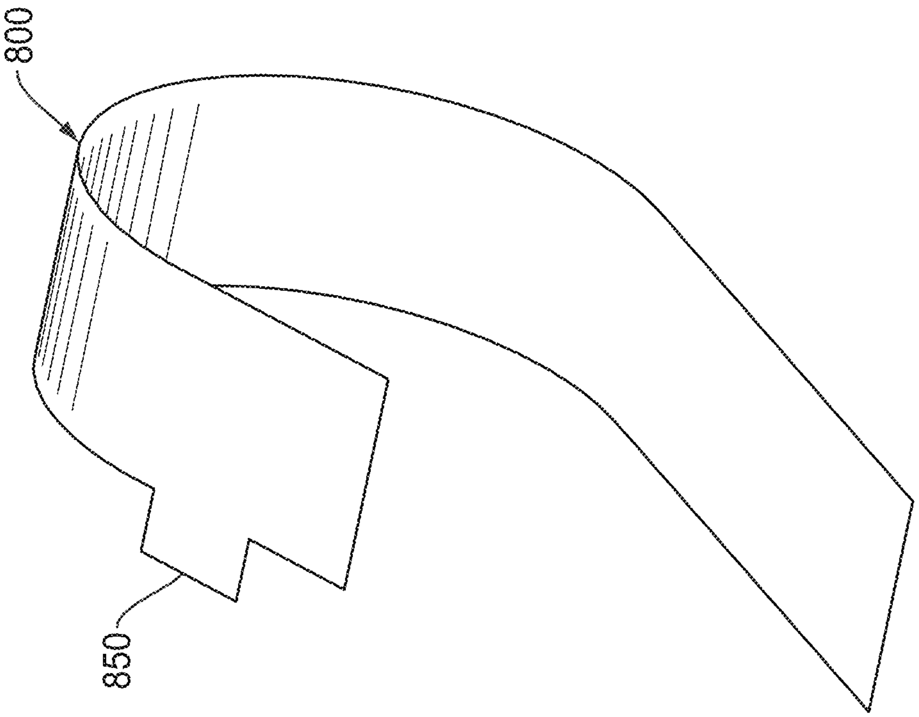
FIG. 9 is a perspective view of a retainer spring with projecting tab.

Spring member 300*b* exemplifies the use of a different restraining mechanism for the spring member. For spring member 300*b*, the first curved region 320*b* wraps around attachment pin 250. The first end section 330*b* has a tab (not shown) that extends axially and is inserted into a slot 345 in the aft flange structure 230. A spring member tab is shown in the embodiment of FIG. 9. The tab and slot arrangement provides restraining structure to hold spring member 300*b* in compression. By using the tab and slot arrangement to restrain spring member 300*b*, the spring member can be positioned to hold the cover plate/impingement plate 270 in place before attachment pin 250 is inserted into the BOAS segment 200. While only one spring member 300*b* interacting with attachment pin 250 is shown in the Figure, it should be understood the multiple spring members 300*b* can be provided that interact with attachment pin 250. It should further be understood that spring members 300*b* can also be provided to interact with pin 240.

Figure 6:
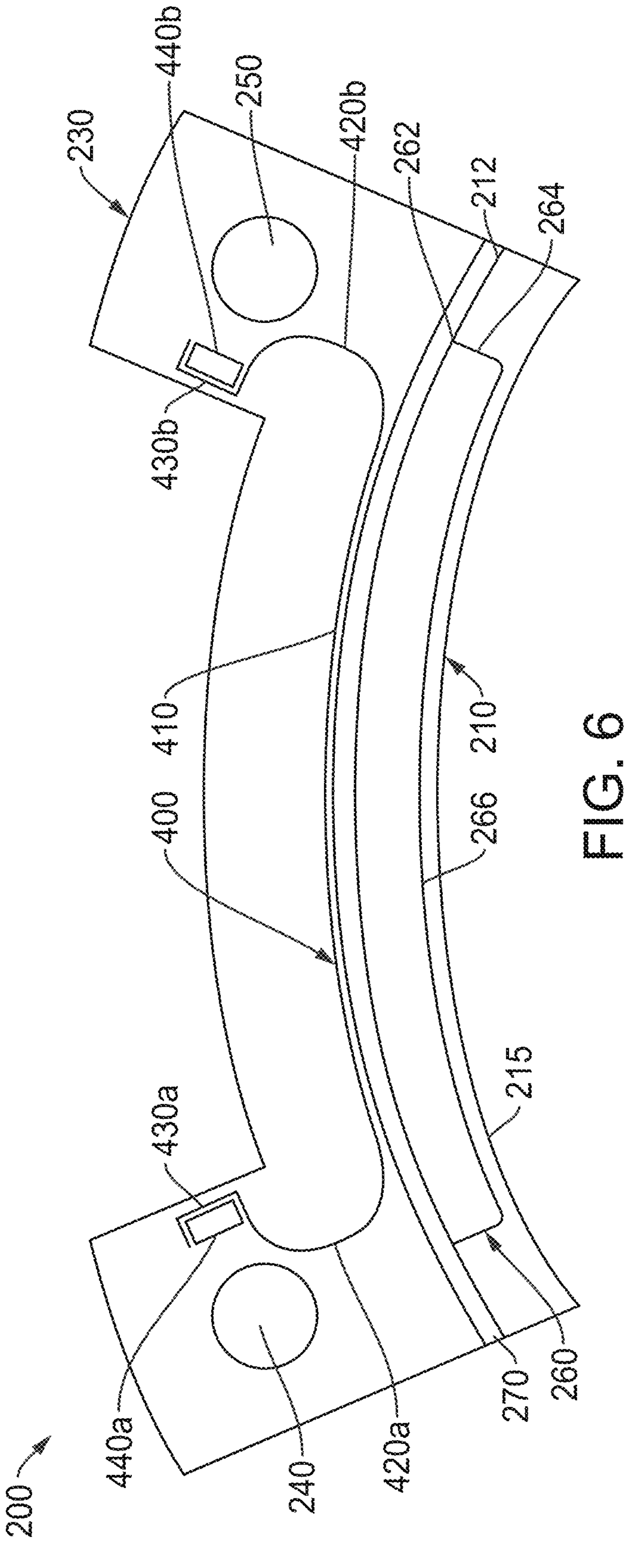
FIG. 6 is a cross sectional view of a BOAS segment with a further embodiment of retainer spring which utilizes tabs projecting from a flange structure for positioning.

FIG. 6 shows a further modification of the embodiment of FIG. 4 in which tabs are used as restraining members. Spring member 400 includes a contact region 410 that contacts the cover plate/impingement plate 270. While only one spring member is shown in the Figure, it should be understood that multiple spring members can be used. The spring member is in compression and applies a force to the cover plate/impingement plate 270 via the contact region 410. The contact region 410 is connected to a first curved region 420*a* and a second curved region 420*b*. The first curved region 420*a* is connected to a first end section 430*a* of the spring member 400. The second curved region 420*b* is connected to a second end section 430*b* of the spring member 400.

As shown in FIG. 6, tabs 440*a* and 440*b* extend from the surface of the aft flange structure 230 at a point adjacent the openings for the attachment pins. As an alternative, tabs 440*a* and 440*b* could extend from the surface of the forward flange structure 220. The first end section 430*a* contacts tab 440*a* and the second end section 430*b* contacts tab 440*b*. First end section 430*a* and second end section 430*b* have shapes that match the contour of tabs 440*a* and 440*b*, respectively. In this embodiment, the tabs 440*a* and 440*b* act as restraining members to hold spring member 400 in compression. By using tabs as restraining members, spring member 400 can be placed into position to hold the cover plate/impingement plate 270 in place before attachment pins are inserted into the BOAS segment.

Figure 7:
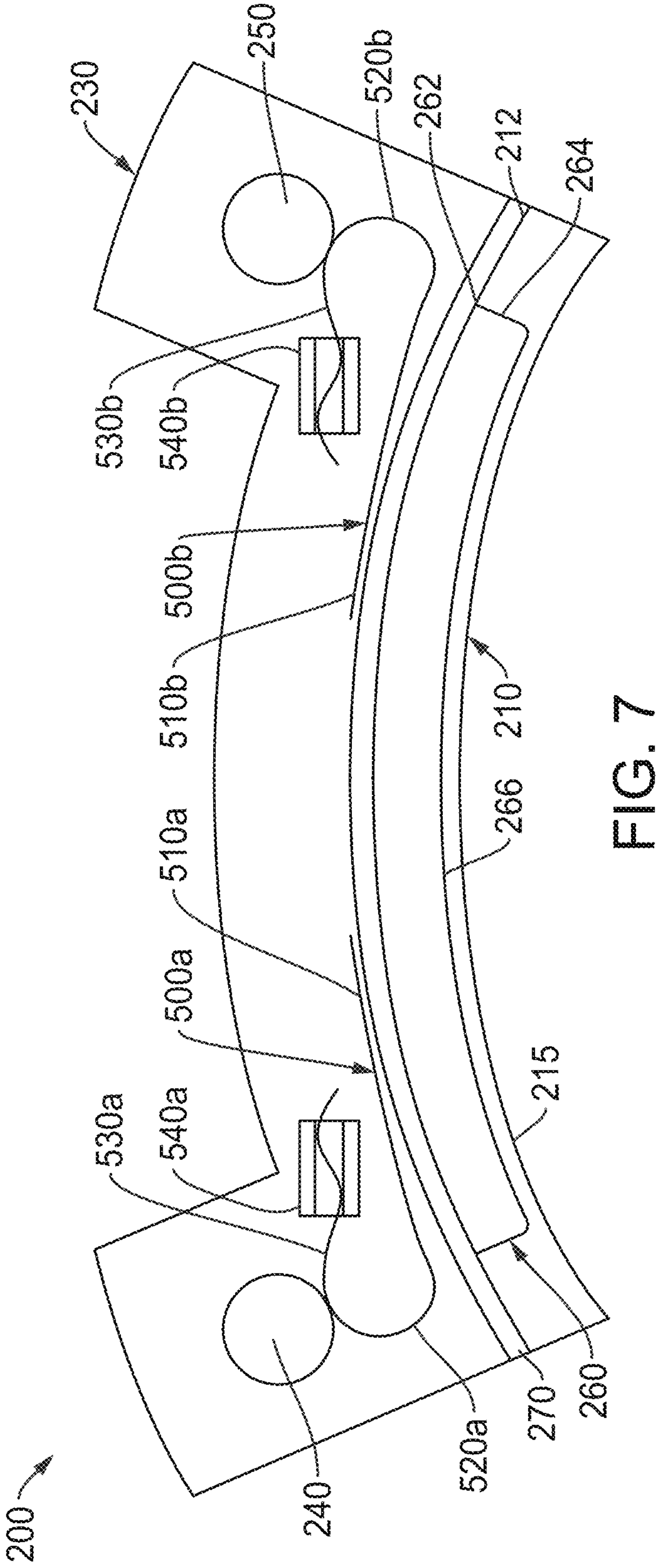
FIG. 7 is a cross sectional view of a BOAS segment with a further embodiment of spring retention using two retainer springs and tabs projecting from a flange structure for positioning.

FIG. 7 shows a further embodiment in which two spring members are used and are held in compression by tabs acting as restraining members. While only two spring members are shown, it should be understood that more than two spring members can be used. Spring members 500*a* and 500*b* each include a contact 510*a* and 510*b*, respectively, that contact the cover plate/impingement plate 270. Both spring members 500*a* and 500*b* are in compression and apply a force to the cover plate/impingement plate 270 by their respective contact regions 510*a* and 510*b*. Each contact region 510*a* and 510*b* is connected to a first curved region, 520*a* and 520*b*, respectively, at one and thereof. As shown in the Figure, first curved regions 520*a* and 520*b* contact attachment pins 240 and 250, respectively, which aids in holding the spring members 500*a* and 500*b* in compression.

In spring member 500*a*, the first curved region 520*a* is connected to a first end section 530*a*. Similarly, in spring member 500*b*, the first curved region 520*b* is connected to a first end section 530*b*. Each of the first end sections 530*a* and 530*b* pass through a hollow tab extending from the aft flange structure 230, i.e., tabs 540*a* and 540*b*, respectively. In the embodiment shown in FIG. 7, tabs 540*a* and 540*b* extend from the surface of the aft flange structure 230 at a point below the openings for the attachment pins. As an alternative, tabs 540*a* and 540*b* could extend from the surface of the forward flange structure 220. Tabs 540*a* and 540*b* act as restraining members to aid in holding spring member 400 in compression and in position. As shown in the Figure, first end sections 530*a* and 530*b* have a wavy structure to facilitate retention of the first end sections within the hollow interior of tabs 540*a* and 540*b*, respectively.

Figure 8:
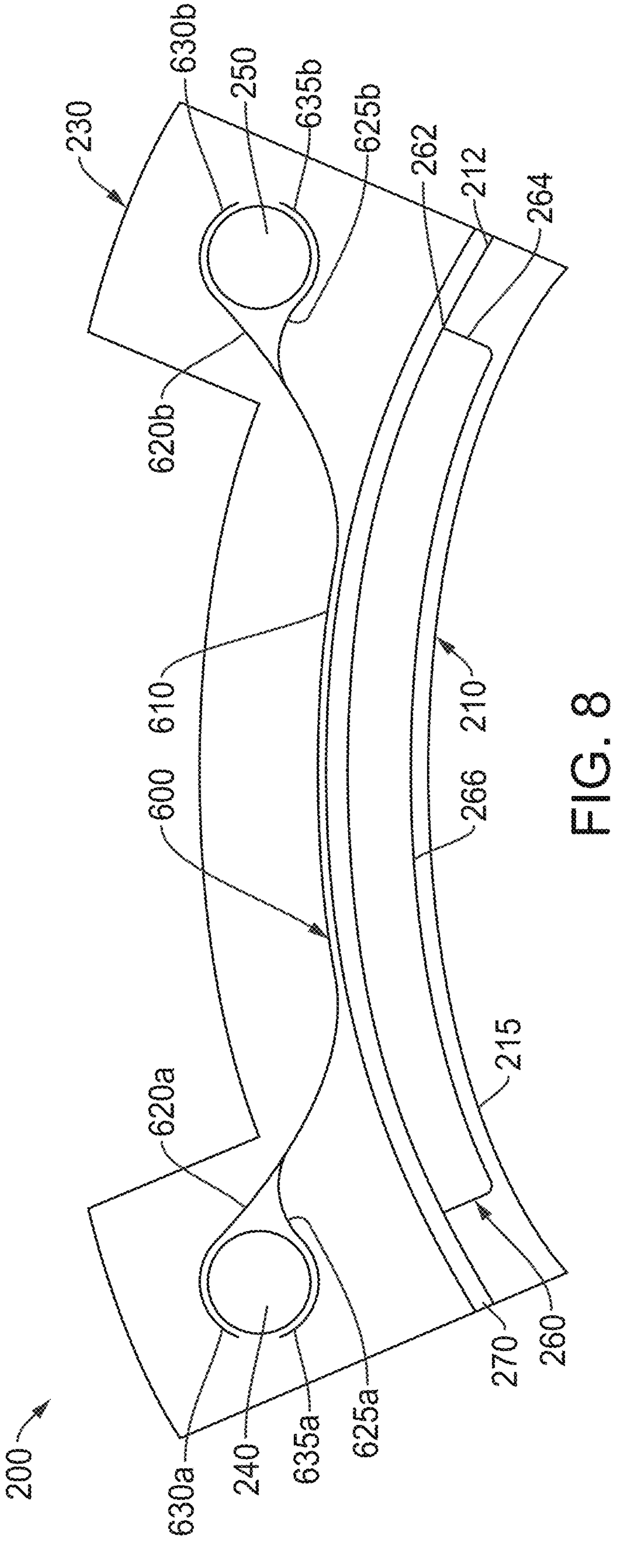
FIG. 8 is a cross sectional view of a BOAS segment with a further embodiment of a retainer spring having split end sections.

FIG. 8 shows a further embodiment of the spring member. While only one spring member is shown in the Figure, it should be understood that multiple spring members can be used. Spring member 600 includes a contact region 610 that contacts the cover plate/impingement plate 270. The spring member is in compression and applies a force to the cover plate/impingement plate 270 via contact region 610. Contact region 610 is connected at one end thereof to a first curved region 620*a* and a second curved region 625*a*. The first curved region 620*a* wraps over the top of attachment pin 240 while second curved region 625*a* wraps around the bottom of attachment pin 240. The first curved region 620*a* is connected to a first end section 630*a* of the spring member 600, and the second curved region 625*a* is connected to a second end section 635*a* of the spring member 600. In other words, the end of spring member 600 is split into two end sections that each interact with the attachment pin 240. The interaction between the first and second curved regions is also shown in FIG. 3.

At another end thereof, contact region 610 is connected to another set of first and second curved regions, i.e., first curved region 620*b* and second curved region 625*b*. First curved region 620*b* wraps over the top of attachment pin 250 while second curved region 625*b* wraps around the bottom of attachment pin 250. The first curved region 620*b* is connected to a first end section 630*b* of the spring member 600, and the second curved region 625*b* is connected to a second end section 635*b* of the spring member 600. Here again, the end of spring member 600 is split into two end sections that each interact with the attachment pin 250.

In this embodiment, the attachment pins 240 and 250 act as restraining members to hold the spring member in compression. When inserting the attachment pins, the pins can pass through the first and second curved regions at each end of spring member 600 to hold the spring in position and in compression.

FIG. 9 shows a spring member 800 exhibiting a spring tab 850 that extends from the first end section in an axial direction. As mentioned above, such an axially extending spring tab can interact with a slot in a flange structure (forward or aft) to aid in restraining the spring member.

Figure 10:
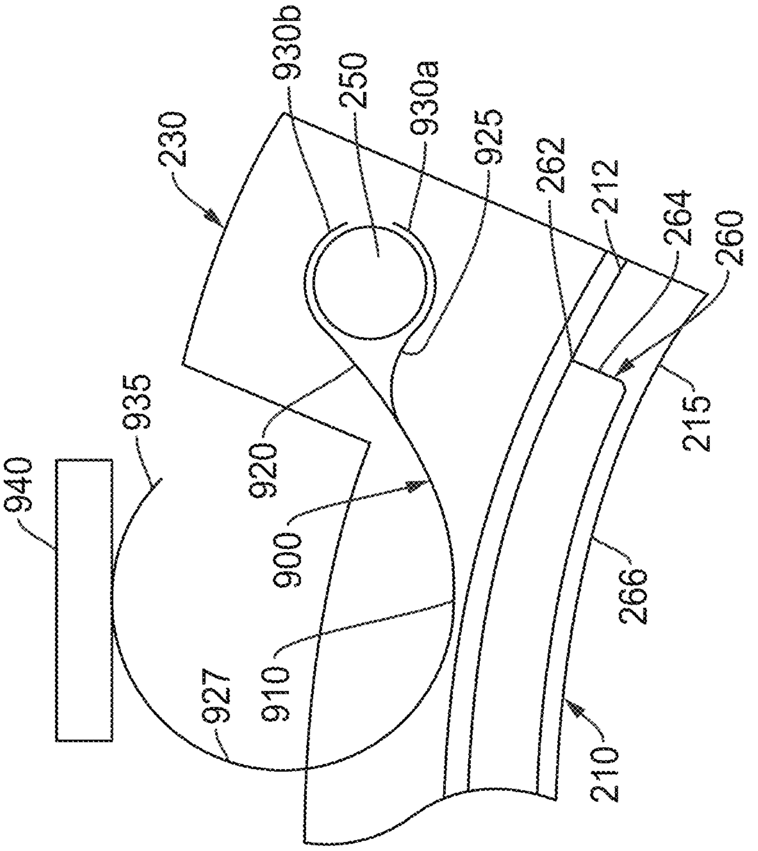
FIG. 10 is portion of a cross sectional of a BOAS segment showing a single retainer spring with a split end section which utilizes other structural features of the engine for restraining.

FIG. 10 shows a portion of a cross sectional view of a further embodiment of the present disclosure. While only one spring member is shown in the Figure, it should be understood that multiple spring members can be used. For example, multiple spring members can interact with attachment pin 250. Additionally, one or more of such spring members can interact with attachment pin 240.

Spring member 900 includes a contact region 910 that contacts the cover plate/impingement plate 270. The spring member is in compression and applies a force to the cover plate/impingement plate 270 via contact region 910. Contact region 910 is connected at one end thereof to a first curved region 920 and a second curved region 925. The first curved region 920 wraps over the top of attachment pin 250 while second curved region 925 wraps around the bottom of attachment pin 250. The first curved region 920 is connected to a first end section 930*a* of the spring member 900, and the second curved region 925 is connected to a second end section 930*b* of the spring member 900. As a result, the end of spring member 900 is split into two end sections that each interact with the attachment pin 250. Such interaction between first and second curved regions is also shown for the spring member in FIG. 3.

Contact region 910 is connected at the other end thereof to a further curved region 927 which in turn is connected to a further end section 935. End section 935 contacts a structure/component 940 of the engine that is radially spaced from the outer radial surface 212 of the BOAS segment. This structure can be, for example, part of the attachment structure that interacts with the BOAS segment, or the attachment pins thereof, to connect BOAS segment to the outer casing of the engine. In this embodiment, structure/component 940 acts as a restraining member to hold spring member 900 in compression.

The spring members of the present disclosure are made from metallic material having sufficient elasticity to function as springs. Additionally, the metallic material needs to have sufficient temperature resistance to withstand the operating temperatures of the engine. Suitable materials include superalloys such as Ni-based and Co-based superalloy materials.

The present disclosure provides an efficient method for retaining cover plates or impingement plates to cover/seal cooling cavities within the interior of CMC components and enhance the cooling of such CMC components to reduce the formation of thermal stresses therein.

While the present disclosure has been particularly described, in conjunction with specific preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present disclosure.

What is claimed is:

1. A ceramic matrix composite (CMC) component comprising:

a base having a radial outer surface and a radial inner surface inward surface, the base comprising a plurality of ceramic fiber plies and a ceramic matrix, a cooling cavity that extends from the outer radial surface of the base into an interior region of the base, the cooling cavity having a cavity opening at the outer radial surface of the base, the cooling cavity being defined by cavity side walls and a cavity bottom wall, an impingement plate or a cover plate covering the cavity opening, at least one spring member comprising a contact region, a first curved region, and a first end section wherein the first curved region is connected to both the contact region and the first end section, the first end section is in contact with a restraining member, and the contact region is in contact with the impingement plate or cover plate and acts to hold the impingement plate or cover plate in position to cover the cavity opening, a forward flange structure and an aft flange structure each extending from the radial outer surface of the base, the forward flange structure having a first attachment pin opening and a second attachment pin opening, and the aft flange structure has a first attachment pin opening and a second attachment pin opening, and a first attachment pin and a second attachment pin for attaching the CMC component to a support structure, the first attachment pin passing through the first attachment opening of the forward flange structure and the first opening of the aft flange structure, and the second attachment pin passing through the second opening of the forward flange structure and the second opening of the second flange structure, wherein the restraining member is either the first attachment pin or the second attachment pin.

2. The CMC component according to claim 1, wherein the spring member further comprises a second curved region and a second end section connected to the second curved region, wherein the contact region is connected to both the first curved region and the second curved region, and the second end section is in contact with a further restraining member.

3. The CMC component according to claim 2,
- wherein the restraining member and further restraining member are the first attachment pin and the second attachment pin, respectively.

4. The CMC component according to claim 2, wherein the first end section has a shape that corresponds to the contour of the restraining member at the area of contact, and the second end section has a shape that corresponds to the contour of the further restraining member at the area of contact.

5. The CMC component according to claim 1, wherein the first end section has a shape that corresponds to the contour of the restraining member at the area of contact.

6. The CMC component according to claim 1, wherein the component is a blade outer air seal (BOAS) segment.

7. A BOAS assembly comprising a plurality of BOAS segments according claim 6, wherein the BOAS segments are arranged to form an annular shaped structure.

8. A method of assembling a CMC component with an impingement plate or cover plate, the method comprising:
- providing a CMC component comprising:
  - a base having a radial outer surface and a radial inner surface inward surface, the base comprising a plurality of ceramic fiber plies and a ceramic matrix,
  - a cooling cavity that extends from the outer radial surface of the base into an interior region of the base, the cooling cavity having a cavity opening at the outer radial surface of the base, the cooling cavity being defined by cavity side walls and a cavity bottom wall,
  - a forward flange structure and an aft flange structure each extending from the radial outer surface of the base, the forward flange structure having a first attachment pin opening and a second attachment pin opening, and the aft flange structure has a first attachment pin opening and a second attachment pin opening, and
  - a first attachment pin and a second attachment pin for attaching the CMC component to a support structure, the first attachment pin passing through the first attachment opening of the forward flange structure and the first opening of the aft flange structure, and the second attachment pin passing through the second opening of the forward flange structure and the second opening of the second flange structure, providing an impingement plate or a cover plate to cover the cavity opening, and
- retaining the impingement plate or cover plate in a position to cover the cavity opening using at least one spring member comprising a contact region, a first curved region, and a first end section wherein the first curved region is connected to both the contact region and the first end section, the first end section is in contact with a restraining member, and the contact region is in contact with the impingement plate or cover plate and acts to hold the impingement plate or cover plate in position to cover the cavity opening,
- wherein the restraining member is either the first attachment pin or the second attachment pin.

9. The method according to claim 8, wherein the spring member further comprises a second curved region and a second end section connected to the second curved region, wherein the contact region is connected to both the first curved region and the second curved region, and the second end section is contact with a further restraining member.

10. The method according to claim 8, wherein the spring member further comprises a second curved region and a second end section connected to the second curved region, wherein the contact region is connected to both the first curved region and the second curved region, and the second end section is in contact with a further restraining member.

11. The method according to claim 10, wherein the restraining member and further restraining member are the first attachment pin and the second attachment pin, respectively.

12. The method according to claim 11, wherein the first end section has a shape that corresponds to the contour of the restraining member at the area of contact, and the second end section has a shape that corresponds to the contour of the further restraining member at the area of contact.

13. The method according to claim 8, wherein the first end section has a shape that corresponds to the contour of the restraining member at the area of contact.

14. The method according to claim 8, wherein the component is a blade outer air seal (BOAS) segment.

15. The method according to claim 8, wherein the component is a BOAS assembly comprising a plurality of BOAS segments arranged to form an annular shaped structure.

16. A turbine engine comprising:
- a fan section, a compressor section, a combustion chamber, and a turbine section, the turbine section including at least one rotor and one or more turbine blade(s) extending radially outwardly from the at least one rotor;
- a blade outer air seal assembly positioned between the one or more turbine blade(s) and an outer casing to the engine;
- the blade outer air seal is formed of a plurality blade outer air seal segments, wherein each blade outer air seal segment comprises:
  - a base having a radial outer surface and a radial inner surface inward surface, the base comprising a plurality of ceramic fiber plies and a ceramic matrix,
  - a cooling cavity that extends from the outer radial surface of the base into an interior region of the base, the cooling cavity having a cavity opening at the outer radial surface of the base, the cooling cavity being defined by cavity side walls and a cavity bottom wall,
  - a forward flange structure and an aft flange structure each extending from the radial outer surface of the base, the forward flange structure having a first attachment pin opening and a second attachment pin opening, and the aft flange structure has a first attachment pin opening and a second attachment pin opening, and
  - a first attachment pin and a second attachment pin for attaching the CMC component to a support structure, the first attachment pin passing through the first attachment opening of the forward flange structure and the first opening of the aft flange structure, and the second attachment pin passing through the second opening of the forward flange structure and the second opening of the second flange structure,
  - an impingement plate or a cover plate covering the cavity opening, and at least one spring member comprising a contact region, a first curved region, and a first end section wherein the first curved region is connected to both the contact region and the first end section, the first end section is in contact with a restraining member, and the contact region is in contact with the impingement plate or cover plate and acts to hold the impingement plate or cover plate in position to cover the cavity opening wherein the restraining member is either the first attachment pin or the second attachment pin.

17. The turbine engine according to claim 16, wherein the spring member further comprises a second curved region and a second end section connected to the second curved region, wherein the contact region is connected to both the first curved region and the second curved region, and the second end section is in contact with a further restraining member.

18. The turbine engine according to claim 17, wherein the restraining member and further restraining member are the first attachment pin and the second attachment pin, respectively.

* * * * *